(12) United States Patent
Hirayama (10) Patent No.: US 7,176,922 B2
(45) Date of Patent: *Feb. 13, 2007

(54) INFORMATION PROCESSING APPARATUS

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

This patent is subject to a terminal disclaimer.

(21) Appl. No.: 10/775,940

(22) Filed: Feb. 10, 2004

(65) Prior Publication Data

US 2004/0160442 A1 Aug. 19, 2004

Related U.S. Application Data

(63) Continuation of application No. 10/216,196, filed on Aug. 12, 2002, now Pat. No. 6,791,546, which is a continuation of application No. 08/095,348, filed on Jul. 23, 1993, now Pat. No. 6,507,342, which is a continuation of application No. 07/643,194, filed on Jul. 18, 1991, now abandoned.

(30) Foreign Application Priority Data

Jan. 19, 1990 (JP) ............................. P2-009627

(51) Int. Cl.
*G06T 11/20* (2006.01)
*G09G 5/00* (2006.01)
(52) U.S. Cl. ...................... 345/440; 715/537; 715/732; 715/776
(58) Field of Classification Search ................ 345/440, 345/730, 732, 763, 769, 776, 901; 707/7; 715/537, 534, 535, 531, 732, 776
See application file for complete search history.

(56) References Cited

U.S. PATENT DOCUMENTS

| 4,475,239 A | | 10/1984 | Van Raamsdonk | |
|---|---|---|---|---|
| 4,839,634 A | | 6/1989 | More et al. | |
| 4,855,725 A | | 8/1989 | Fernandez | |
| 4,870,503 A | | 9/1989 | Miura | |
| 4,887,129 A | | 12/1989 | Shenoy et al. | |
| 5,179,658 A | * | 1/1993 | Izawa et al. ................ | 345/536 |
| 5,297,202 A | * | 3/1994 | Kapp et al. ................... | 705/75 |
| 5,452,379 A | * | 9/1995 | Poor .......................... | 382/317 |
| 5,598,487 A | * | 1/1997 | Hacker et al. .............. | 382/313 |

FOREIGN PATENT DOCUMENTS

| EP | 0 271 280 | 6/1988 |
|---|---|---|
| EP | 0 379 336 | 7/1990 |
| WO | WO 98/01658 | 2/1989 |

* cited by examiner

*Primary Examiner*—Dennis-Doon Chow
(74) *Attorney, Agent, or Firm*—Sonnenschein Nath & Rosenthal LLP (57) ABSTRACT

An information processing apparatus is comprised of a data input device for inputting informations, a memory for storing the informations input by the data input device, a processor for processing the informations in a form of a plurality of pages, a displaying device for displaying the informations formed in a unit of the pages, a device for registering image data in respect of owner name input by the data input device, a device for judging whether or not a predetermined process is done at one of the pages, and a device for storing the image data at a predetermined position of the one of the pages by a judged result of the judging device, wherein when the one of the pages is displayed, the stored image data is displayed with the informations.

1 Claim, 12 Drawing Sheets

INFORMATION PROCESSING APPARATUS

CROSS-REFERENCE TO RELATED APPLICATIONS

The present application is a continuation of U.S. application Ser. No. 10/216,196 filed Aug. 12, 2002 now U.S. Pat. No. 6791,546, which is a continuation of U.S. application Ser. No. 08/095,348 filed Jul. 23, 1993 now U.S. Pat. No. 6,507,342, which is a continuation of U.S. application Ser. No. 07,643,194 filed Jul. 18, 1991, now abandoned, and which claims priority from Japanese Patent Application No. P009627/90 filed Jan. 19, 1990.

BACKGROUND OF THE INVENTION

1. Field of the Invention

The present invention relates generally to information processing apparatus and, more particularly, is directed to an information processing apparatus in which a writer name of data is written in data group formed in a unit of page or in a unit of card group.

2. Description of the Prior Art

In a conventional computer (hereinafter simply referred to as a central processing unit (CPU)) and so on, such a program is generally utilized, in which many data stored in a memory are stored in the form of a plurality of pages or in the form of a plurality of cards. In the program in which data are stored in the form of pages, predetermined data are collected in a unit of pages, whereas in the program in which data are stored in the form of cards, cards indicating one data are stored randomly. In the following description, data formed in a unit of page and in a unit of card are treated together as a plurality of data formed at every page. In the data formed in a unit of page, such as a notebook or the like, owner name column, address column and so on are provided at the end of the notebook, and owner name and so on are written in these columns.

When the data formed in a unit of page or in a unit of card is considered, there are then disadvantages that the writer name, recording date or the printed out date of one of pages or cards sorted at every page or at every card cannot be known. Particularly, while the writer of data can be known from a writing stroke of hand-written character or the like, the writer of data written with a word processor can not be defined. Even when the writer writes data by hand-writing, if such hand-written data is displayed or recorded as printing type data, then the writer cannot be defined without difficulty.

OBJECTS AND SUMMARY OF THE INVENTION

Accordingly, it is an object of the present invention to provide an improved information processing apparatus which can eliminate the aforenoted shortcomings and disadvantages encountered with the prior art.

More specifically, it is an object of the present invention to provide an information processing apparatus in which if data is written, a signature of writer of data is recorded on the end portion of page data without fail.

It is another object of the present invention to provide an information processing apparatus in which writer name, date of writing and date of copying can be known.

As an aspect of the present invention, an information processing apparatus is comprised of a data input device for inputting informations, a memory for storing the informations input by the data input device, a processor for processing the information in a form of a plurality of pages, a displaying device for displaying the informations formed in a unit of the pages, a device for registering image data in respect of owner name input by the data input device, a device for judging whether or not a predetermined process is done at one of the pages, and a device for storing the image data at a predetermined position of the one of the pages by a judged result of the judging device, wherein when the one of the pages is displayed, the stored image data is displayed with the information.

The above, and other objects, features and advantages of the present invention will become apparent in the following detailed description of an illustrative embodiment to be read in conjunction with the accompanying drawings, in which like reference numerals are used to identify the same or similar parts in the several views.

BRIEF DESCRIPTION OF THE DRAWINGS

FIG. 2 (formed of FIGS. 2A and 2B drawn on two sheets of drawings so as to permit the use of a suitably large scale) is a flowchart of the embodiment of the information processing apparatus according to the present invention, and to which references will be made in explaining an operation in which a writer's name is copied;

FIG. 3 (formed of FIGS. 3A and 3B drawn on two sheets of drawings so as to permit the use of a suitably large scale) is a flowchart of the embodiment of the information processing apparatus according to the present invention, and to which references will be made in explaining an operation in which a time is written;

DETAILED DESCRIPTION OF THE PREFERRED EMBODIMENT

An embodiment of an information processing apparatus according to the present invention will hereinafter be described with reference to FIGS. 1 to 6. Prior to describing the present invention with reference to FIG. 1, the embodiment in which the information processing apparatus of the present invention is applied to a very small computer will be explained with reference to FIGS. 5 and 6.

Figure 5:
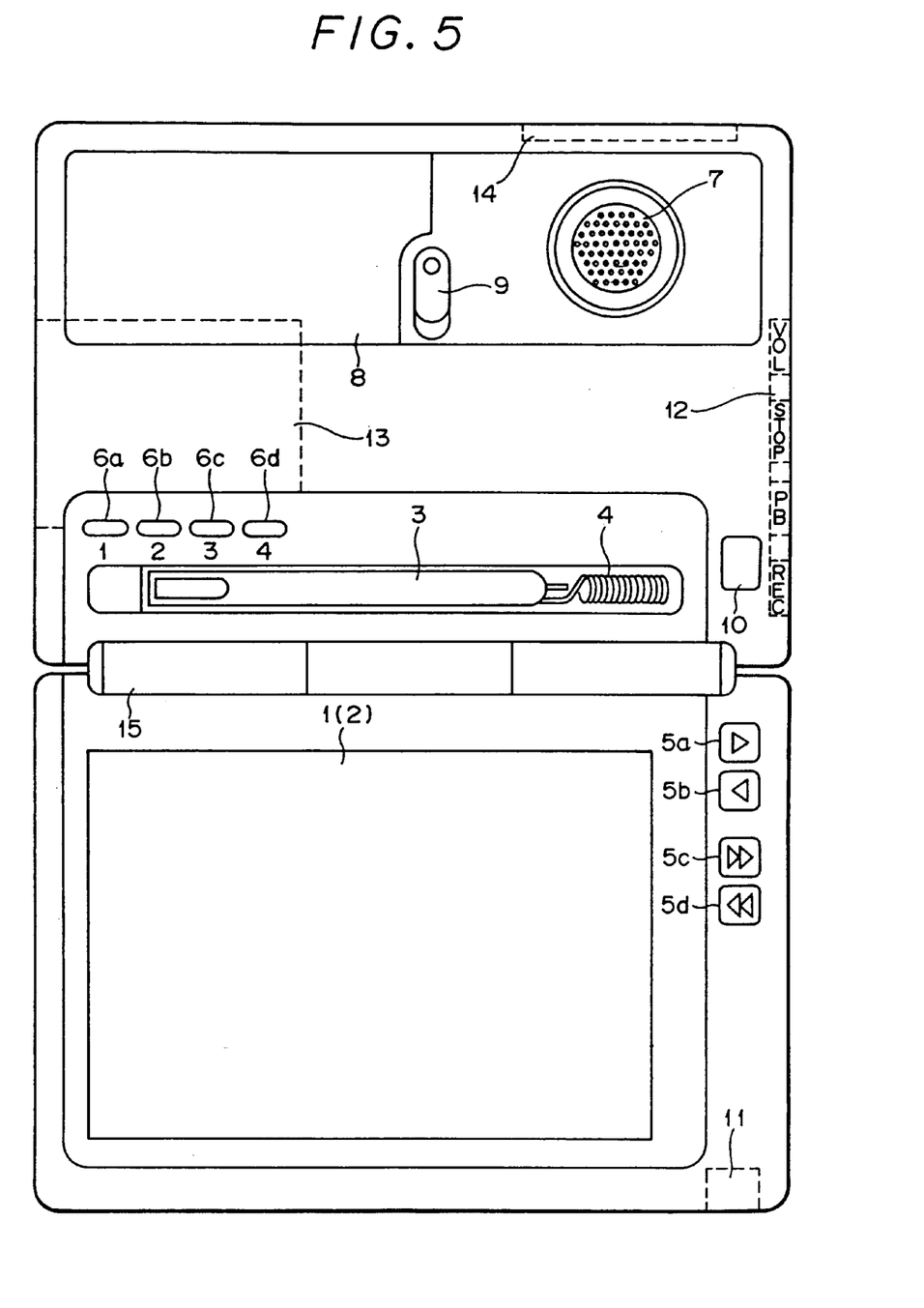
FIG. 5 is a front view illustrating the embodiment of the information processing apparatus according to the present invention.

FIG. 5 shows a front view of this information processing apparatus. Referring to FIG. 5, there is provided a display apparatus 1 formed of a liquid crystal display (LCD) device or the like, that is, a display section 1. The display section 1 displays on a picture screen thereof video image data from a central processing unit (CPU) or the like which will be explained later. An input apparatus, that is, an input tablet 2 formed of a so-called transparent touch sensor or the like is provided on the surface of the display section 1. A pen 3 is adapted to input arbitrary data or the like in cooperation with the input tablet 2. The CPU incorporates therein a detecting means for sensing the change of electrostatic capacity of the input tablet 2 and the pen 3 via the pen 3 so that, even when the point of the pen 3 is not in contact with the input tablet 2, its coordinates can be detected by the detecting means. Also, a cursor is displayed on the display section 1 at its position opposing to the point of the pen 3. When the user picks up the pen 3 and touches the input tablet 2 with the point of the pen 3, then informations such as their contact condition, contact position and so on are supplied through a cord 4 or the like to the CPU, thereby arbitrary data being input to the CPU. Further, reference numerals 5a, 5b, 5c, 5d and 6a, 6b, 6c, 6d designate predetermined key switches and signals therefrom are supplied to the CPU.

Reference numeral 7 designates a speaker, and 8 a battery accommodating section in which a power source battery is accommodated in the inside of a lid which is made openable and/or closable by releasing a locking mechanism 9. Further, reference numeral 10 denotes a power switch.

Broken lines in FIG. 5 represent positions of mechanisms or the like provided on the side wall of the apparatus, wherein reference numeral 11 denotes a microphone and 12 an operation key group which is used to perform a solid state recording which will be referred to later. By operating the operation key group 12, an audio signal fed to the microphone 11 is recorded and is emanated from the speaker 7. Further, reference numeral 13 designates a position of a socket into which an IC card such as a read only memory (ROM), a random access memory (RAM) and so on is inserted and connected and reference numeral 14 designates a position of expansion socket which is used to connect this apparatus to external apparatus and so on.

Further, reference numeral 15 designates a hinge which incorporates therein a flexible substrate or the like through which a signal is transmitted. Owing to this hinge 15, this apparatus can be folded into two parts without being affected by an electrical interference or the like. When this apparatus is in use, this apparatus is about 29 cm long and about 20 cm wide in the unfolded state and is about 4 cm thick in the folded state. The display section 1 is about 4 cm long and 10 cm wide.

Figure 6:
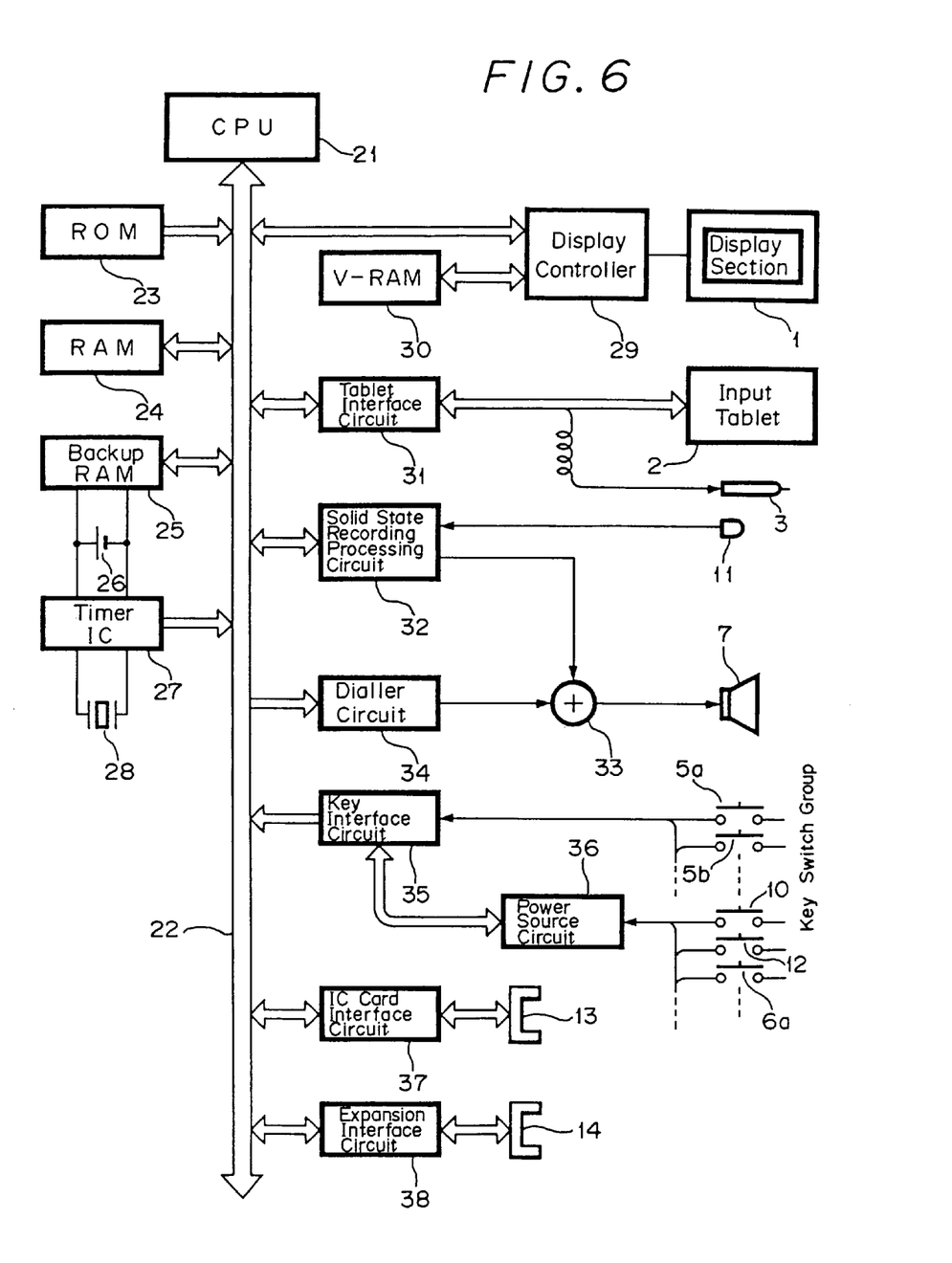
FIG. 6 is a schematic block diagram showing an overall arrangement of the information processing apparatus according to the present invention.

In this apparatus, an arrangement of hardware incorporated therein is represented in FIG. 6.

Referring to FIG. 6, there is shown the CPU 21 to which various function ICs and so on are connected through a bus line 22. A ROM 23 is connected through the bus line 22 to the CPU 21, and in addition to a system program for controlling the entirety of this apparatus, a Kana-kanji conversion program for word processing function in Japanese, a dictionary table therefor, a hand-written input information recognition program and a dictionary table therefor and so on are written in this ROM 23.

Further, reference numeral 24 designates a RAM for work area, and 25 a backup RAM to which a power source 26 is connected.

Reference numeral 27 designates a timer IC, and this timer IC 27 is driven by the power source 26. The timer IC 27 also counts clocks generated from a quartz oscillator 28 and always outputs data of date and clock at the time point when it counts the clock.

Connection relations between this hardware and respective sections in the front view of FIG. 5 will be explained hereinafter with reference to FIG. 6.

Referring to FIG. 6, a display controller 29 is shown to control the display section 1. This display controller 29 is controlled by the CPU 21 and display data made by the CPU 21 is written in the V-RAM (video RAM) 30 through the display controller 29. Also, data written in the V-RAM 30 is supplied through the display controller 29 to the display section 1, thereby being displayed in a predetermined manner.

A tablet interface circuit 31 is provided for the input tablet 2 which is integrally formed with the display section 1 and the pen 3. By way of the interface circuit 31, data or the like written in the input tablet 2 is supplied to the CPU 21, in which it is processed in a predetermined manner.

A solid state recording processing circuit 32 is provided to process an audio signal from the microphone 11 in a predetermined manner such as an analog-to-digital (A/D) conversion or the like. The thus processed signal is stored in the backup RAM 25 through the CPU 21. Audio data stored in the backup RAM 25 is supplied to the solid state recording processing circuit 32, in which it is processed in a predetermined manner such as a digital-to-analog (D/A) conversion or the like, the thus processed signal being fed through a mixer 33 to the speaker 7.

Further, reference numeral 34 designates a dialler circuit which generates, when supplied with arbitrary data such as a phone number or the like from the CPU 21, an acoustic signal corresponding to a dual tone signal such as a phone number or the like of a so-called push phone. This acoustic signal from the dialler circuit 34 is supplied through the mixer 33 to the speaker 7.

A key interface circuit 35 is adapted to receive directly or through a power source circuit 36 signals from key switch group such as the above-mentioned keys 5a to 5d, 6a to 6d, 10 and 12 or the like. From this key interface circuit 35, a signal converted in a predetermined manner is supplied to the CPU 21. Incidentally, key switches 12 other than the power switch 10, the key switches 6a to 6d and the stop button are connected through the power source circuit 36 to the key interface circuit 35. When these key switches are operated, the power source circuit 36 is driven first and then informations indicative of the ON or OFF state of these key switches are supplied to the key interface circuit 35.

An IC card interface circuit 37 and an expansion interface circuit 38 are connected to the bus line 22 and the sockets 13 and 14. The IC card interface circuit 37 is used to connect the IC card to this apparatus and the expansion interface circuit 38 is used to connect this apparatus to external apparatus when the system of this information signal processing apparatus is expanded.

Figure 4A:
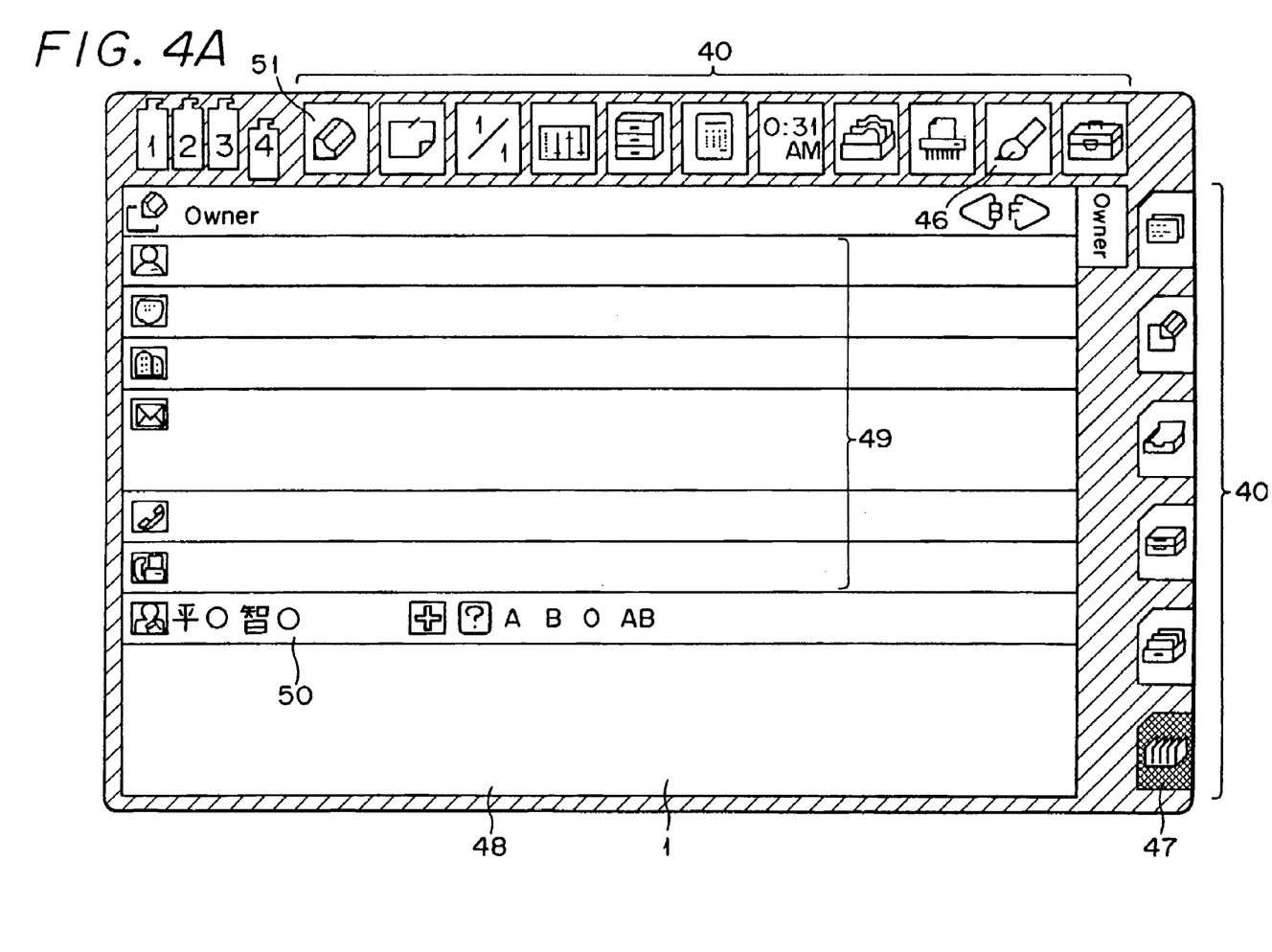
FIGS. 4A to 4E are schematic diagrams of examples of picture screens, and to which references will be made in explaining operations of the information processing apparatus of the present invention.
Figure 4B:
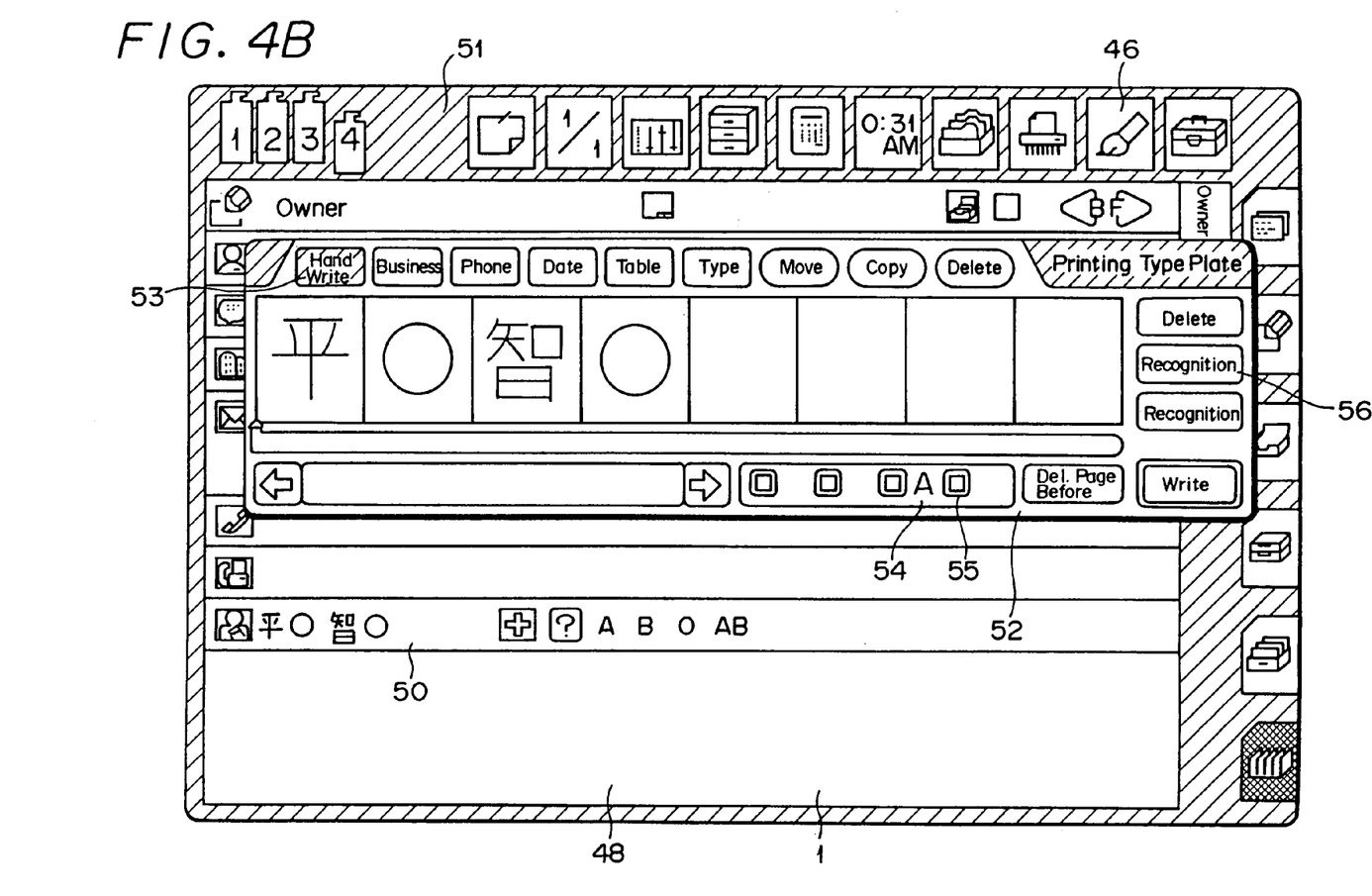
Figure 4C:
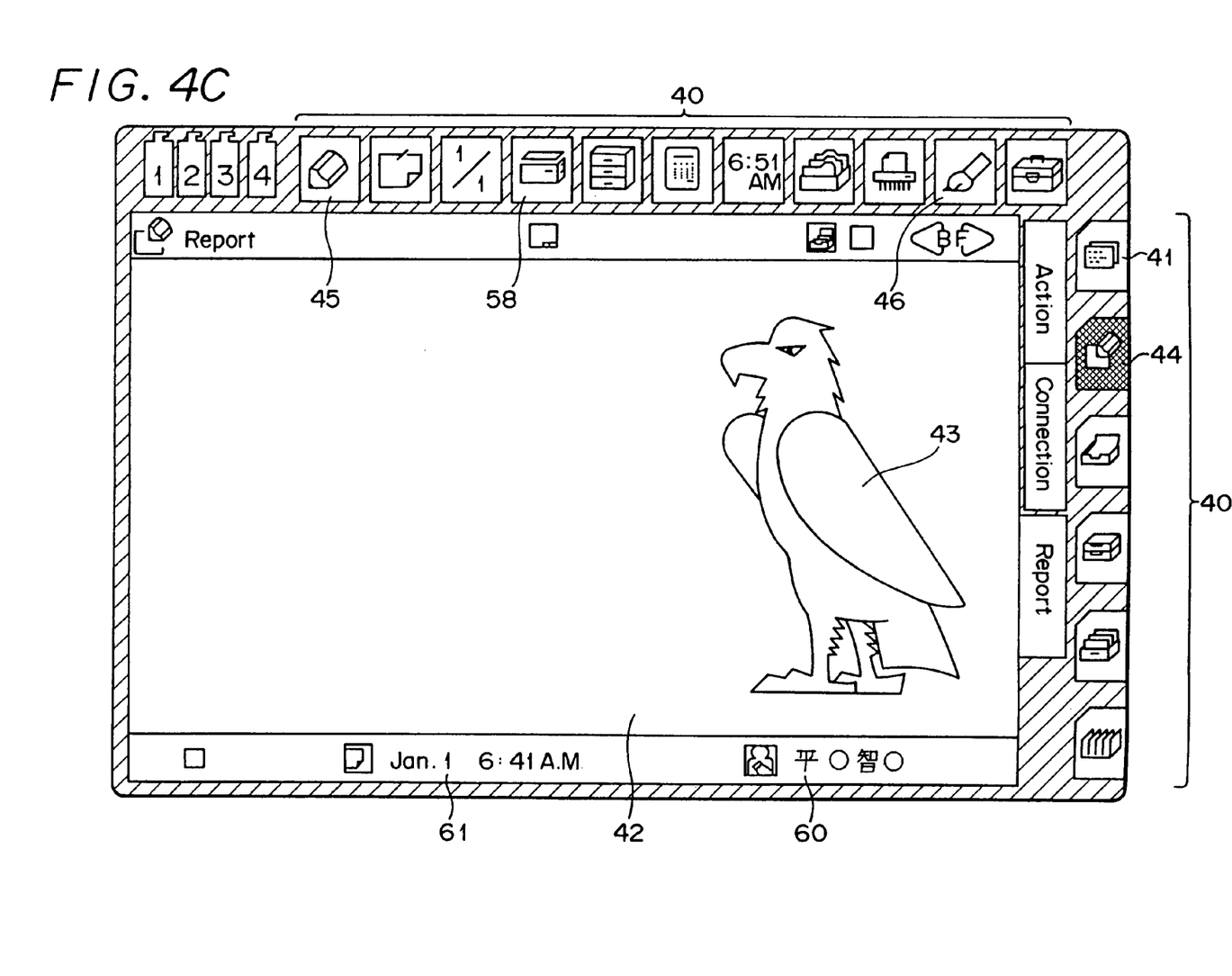

In the above-mentioned very small computer, when the power switch 10 shown in FIG. 5 is depressed, then icon groups 40 which can effect various processings shown in FIG. 4C are displayed on the upper portion and right-hand side of the display section 1. If an icon 41 described as [see] of the icon groups 40 is touched with the point of the pen 3 and one of characters train of [action], [connection], [report] and so on displayed on the left side of the [see] icon 41, for example, [report] is touched with the point of the pen 3, a report picture 42 shown in FIG. 4C is displayed on the display section 1. In this case, a picture of eagle 43 drawn on the report picture 42 is a picture drawn, for example, on the first page of the report page. A name 60 who draws this picture is displayed on the end portion of this report page. Such many pages are memorized in the memory as report data and stored therein. Each page on these report pictures is not provided with a page number because it is very troublesome to re-write the page number when one report is stored. Further, the content of [report] is not limited to the figure or the like and sentences and so on are written in the [report] in most cases. Of course, if a write icon 44 described as [write] is touched with the point of the pen 3, and of the icon groups 40 arrayed on the upper portion of the display section 1, a printing type icon 45 described as [printing type] or a figure icon 46 described as [figure] is touched with the point of the pen 3, a printing type plate or a figure plate is dragged in the report picture 42 and the printing type or the figure can be drawn on the report pictures 42. [connection] is generally used to write or to check a telephone directory, an address book and so on. Further, [action] is used to write or to check a schedule table or the like, and respective pages of these various data are stored in the memory in the form of cards.

In this embodiment, together with signature of writer, his sign or pen name, the time when the record, paging and so on are determined and displayed on the predetermined position of each card, for example, on the end portion at every data of the card.

The embodiment of the information processing apparatus according to the present invention will now be described with reference to FIGS. 1 to 4.

Figure 1:
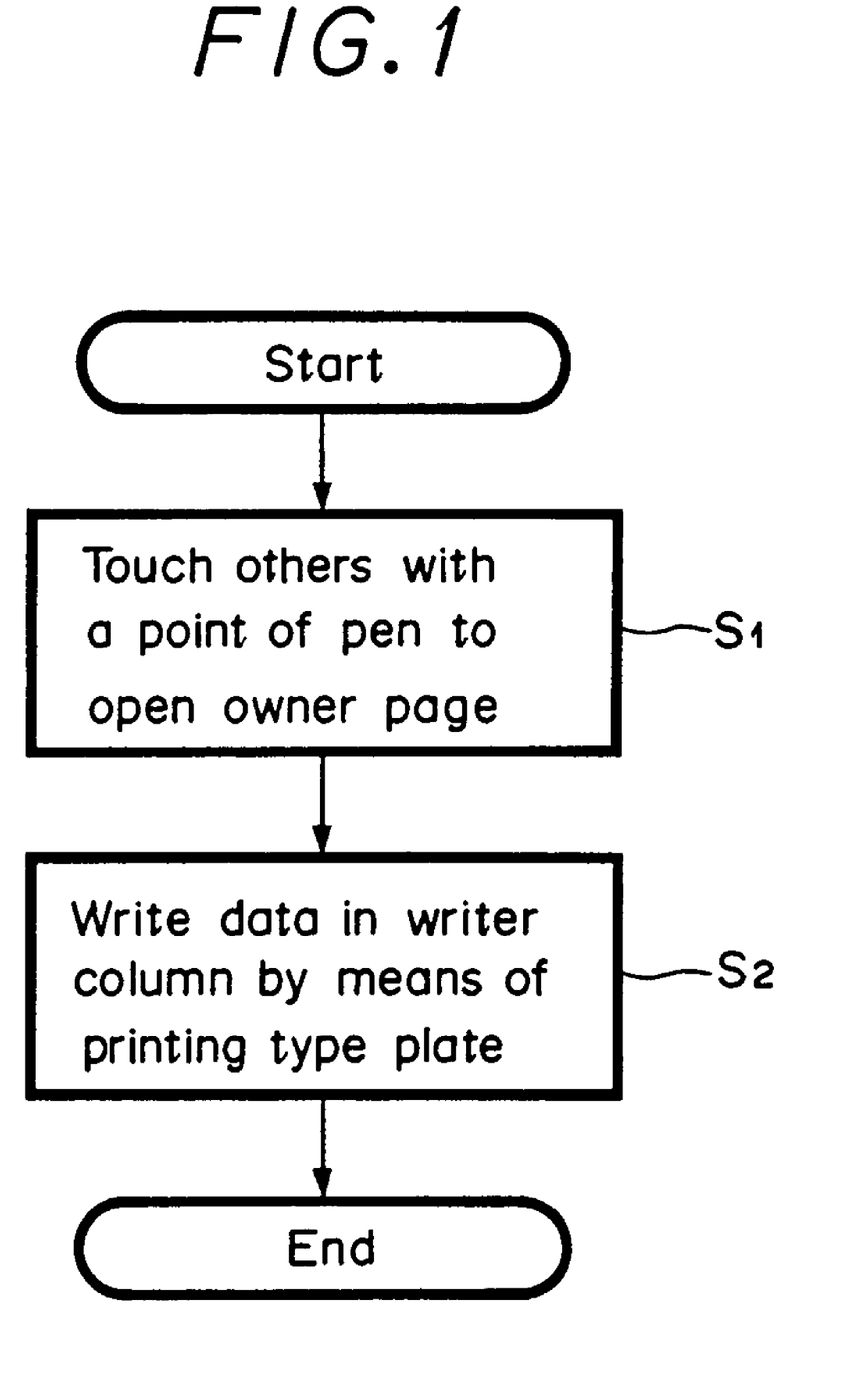
FIG. 1 is a flowchart of an embodiment of an information processing apparatus according to the present invention, and to which references will be made in explaining an operation in which a name of owner is registered.

FIG. 1 shows a flowchart to which references will be made in explaining a method in which a name is registered in the apparatus.

Referring to FIG. 1, following the Start of operation, in first step S1 the power switch 10 is turned ON first and the icon groups 40 are displayed on the upper portion and right portion of the display section 1 as shown in FIG. 4A. When of these icon groups 40 displayed on the right side of the display section 1 other icon 47 described as [others] which is located on the lowermost portion of the icon group 40 is touched with the point of the pen 3 and an owner page is opened, then an owner page picture 48 is displayed on the display portion 1 as shown in FIG. 4A. On the owner page, in addition to a column 49 in which ower's name, address of owner's home, phone number of owner's home, address of owner's company, phone number of owner's company and so on are written, an owner name column 50 in which owner's name such as ≠○ ゼ○, sign or pen name and so on are written is provided. In this owner column, A, B, O and AB denote blood types and ? denotes an unknown blood type. If the owner touches own blood type, the owner's blood type is registered. In second step S2, if the printing type icon 51 described as [printing type] of the icon group 40 is touched with the point of the pen 3 and the top of the pen 3 is dragged up to the center of the picture screen of the display section 1 without lifting the top of the pen 3 from the picture screen of the display section 1, then the printing type icon 51 is enlarged and the printing type plate 52 is obtained as shown in FIG. 4B. This printing type plate 52 is displayed in a superimposed fashion on the owner picture 48, and the printing type plate 52 is displayed at the position in which the point of the pen 3 is lifted off from the picture screen. In the printing type plate 52 superimposed upon the owner picture 48 as described above, a hand-writing key 53 is placed in an active state as shown by a hatched portion in FIG. 4B. If the name of, for example, "≠○ ゼ○" is written on a box-shaped portion 54 of the printing type plate 52 with the pen 3, a kanji key 55 of characters key is touched with the point of the pen 3 and a recognition key 56 is touched with the point of the pen 3, then the CPU 21 recognizes the hand-written characters and converts the recognized characters into predetermined printing type kanji characters, which are then displayed on the box-shaped portion 54. Thus, the registration of the owner's name on the owner name column 50 is finished.

While in the second step S2 the printing type plate 52 is opened and the owner signs his name, the figure plate 46 written as [figure] may be opened and the owner may sign his name on this figure plate 46 or the like.

If registration of owner name, the sign or pen name or the like on the owner name column 50 is finished, then the CPU 21 writes the signed owner name and the registration time on the end portion of each card data in accordance with the flowcharts of FIGS. 2 and 3.

An operation in which the owner name is written in each card data will be explained with reference to FIG. 2 and FIGS. 4C, 4D and 4E.

Figure 2A:
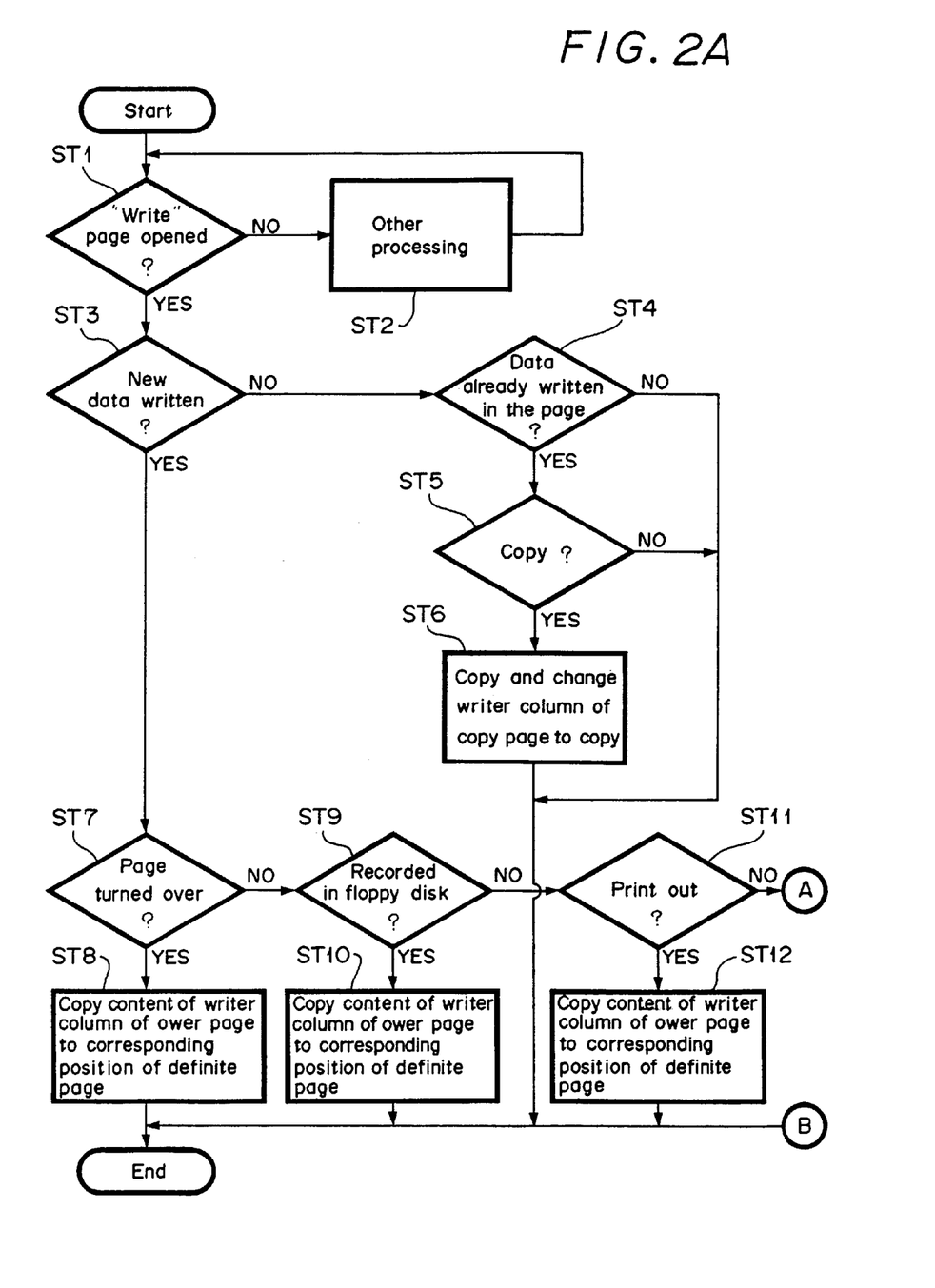
Figure 2B:
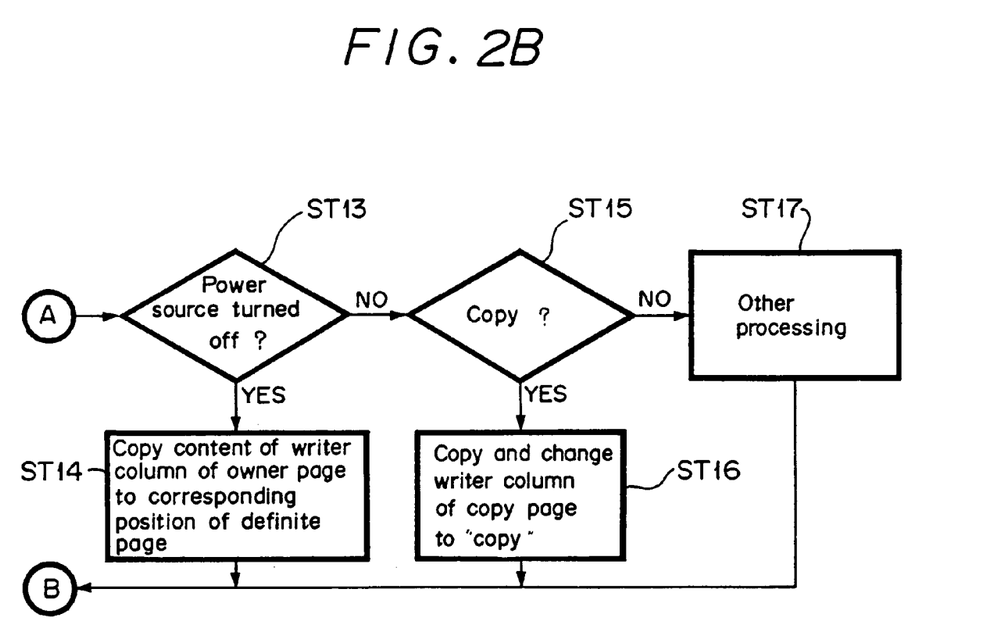

Referring to FIG. 2 (formed of FIGS. 2A and 2B drawn on two sheets of drawings so as to permit the use of a suitably large scale), following the Start of operation, it is determined in first step ST1 whether or not a write page is opened by touching the write icon 44 with the point of the pen 3. If the write page is not opened as represented by a NO at step ST1, then other processing is performed at second step ST2 and the processing returns to the first step ST1. If the write page is opened as represented by a YES at step ST1 then the processing proceeds to third decision step ST3. In third step ST3, it is determined whether or not the figure icon 46 described as [figure] is touched with the point of the pen 3 and the figure plate is reproduced on the report picture 42 of, for example, the display section 1 or the write icon 45 described as [printing type] is touched with the point of the pen 3 and the printing type plate is reproduced on the report picture 42 of, for example, the display section 1, and new figure or new character is written in the figure plate or in the printing type plate. If a NO is output at step ST3, then the processing proceeds to the next fourth decision step ST4. In decision step ST4, it is determined whether or not any data is already written, for example, in the opened report page (action page and connection page may be possible). If no data is written on the opened report page as represented by a NO at step ST4, the opened report page is a blank page and the processing proceeds to the end. If the opened report page or card is a page in which something is already written, this card is sent to the fifth decision step ST5. It is determined in step ST5 whether or not this card is copied. If a NO is output at step ST5, the processing proceeds to the end, whereas if a YES is output at step ST5, then the processing proceeds to fifth step ST6. In step ST6, when the copy is performed, a copy icon 58 (see FIG. 4C)is dragged and the copy processing is carried out by a copy plate 59 shown in FIG. 4D. In this copy plate 59, the copy is performed by designating the number of copies, a page designating key and a copy starting key.

Figure 4D:
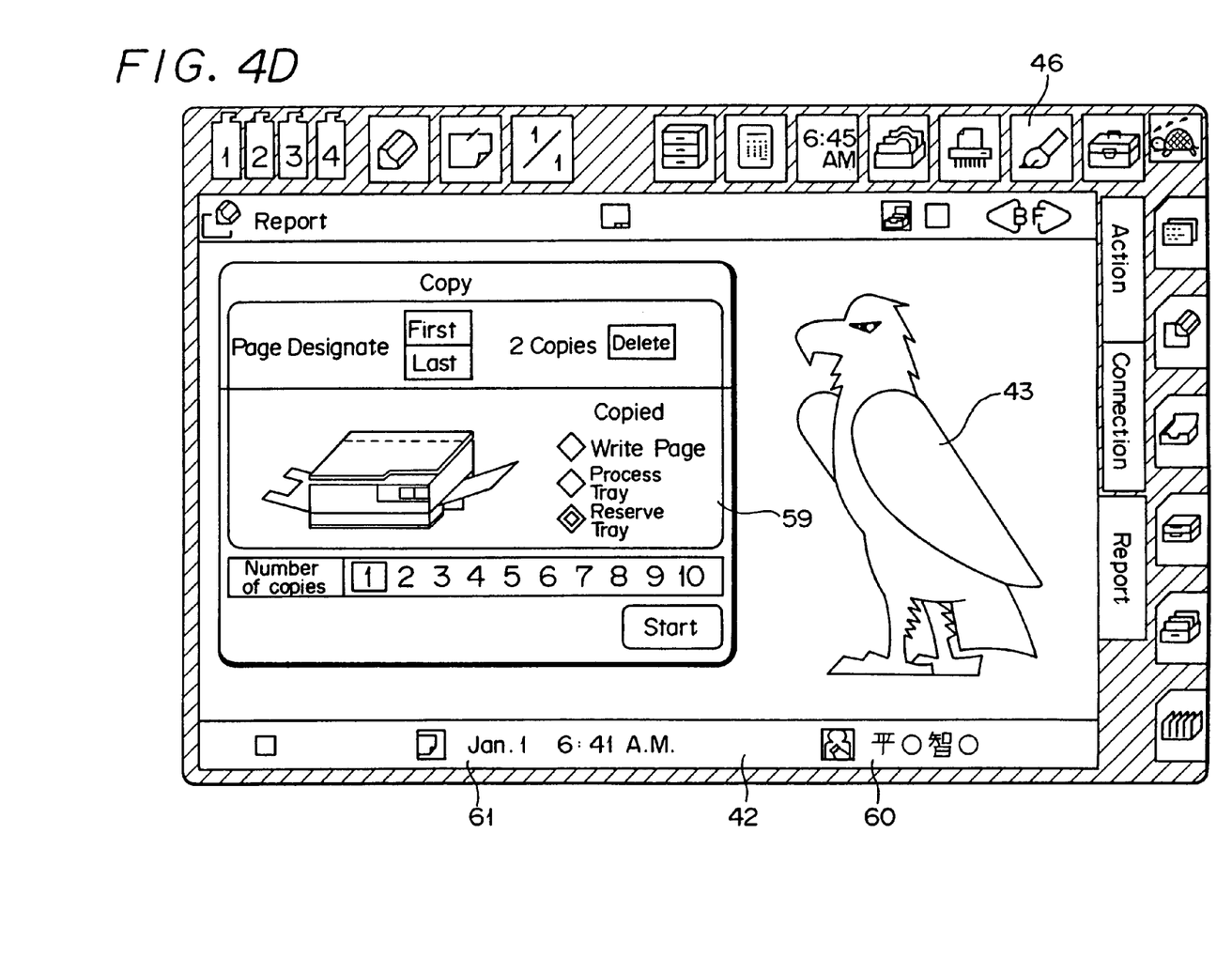
Figure 4E:
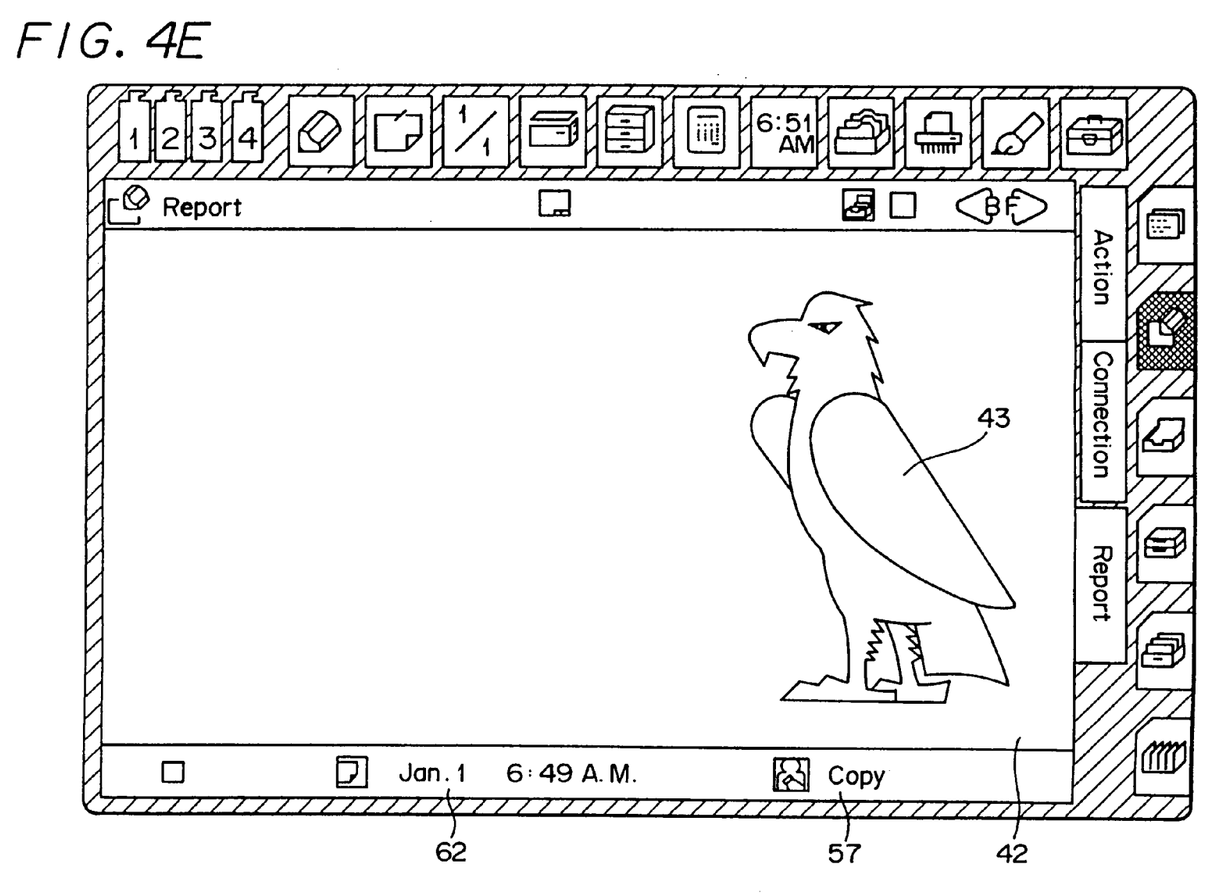

While there is a possibility that a plurality of copies may be required, in these copies, the owner name, sign and pen name (referred to later) written on the owner name column are rewritten as [copy] 57. FIG. 4E shows the report picture in the above-mentioned condition. That is, in the case of the copy, the owner name is not the writer name and the writer name becomes the [copy] 57. If a YES is output at step ST3 in which new data is written in the figure plate or in the printing type plate, then the processing proceeds to the next decision step ST7.

It is determined at decision step ST7 whether or not the page is turned over. If the page is turned over as represented by a YES at step ST7, then the processing proceeds to step ST8, whereat the content of writer column (owner name column), that is, name of [≠○ ゼ○] or the like is copied to the corresponding position of the determined page and then the processing proceeds to the end. If a NO is output at decision step ST7, then the processing proceeds to the next decision step ST9, whereat it is determined whether or not the data is recorded on a floppy disk. If a YES in which data is recorded on the floppy disk is output at step ST9, then the processing proceeds to step ST10 in which the name on the owner name column is copied similarly to step ST8. In that case, step ST9 is not limited to the floppy disk and may be applied to the case that data is recorded on a magnetic medium such as a magnetic tape, a hard disk and so on or a recordable, a rewritable optical disk and so on.

At the completion of step ST10, then the processing proceeds to the end. If a NO is output at step ST9, then the processing proceeds to the next decision step ST11. It is determined in step ST11 whether or not the card, which is turned over, is printed out. If the card is printed out as represented by a YES at step ST11, then the owner name is copied similarly to step ST8 and the processing proceeds to the end. If a NO is output at step ST11, then the processing proceeds to the next decision step ST13. It is determined in step ST13 whether or not the power source is turned OFF. If the power source is turned OFF as represented by a YES at step ST13, then the processing proceeds to step ST14, whereat the owner name is copied similarly to the step ST8. Then, the processing proceeds to the end. Under the condition that the steps ST8, ST10, ST12 and ST14 are finished, as shown in FIGS. 4C and 4D, a name 60 signed on the end portion of each card data is displayed.

If a NO is output at step ST13, then the processing proceeds to the next decision step ST15, whereat it is determined whether or not the name is copied. If a YES is output at step ST15, then the processing proceeds to step ST16. In step ST16, the copy is performed similarly to step ST6, and the writer column of the copied page is changed to [copy] 57 as shown in FIG. 4E. That is, in step ST16, since it is the copy of the writer who describes the data in the card, the signature of owner name is removed. While the flowchart in steps ST4 to ST6 illustrates the case such that the owner name signed on the card data in which something is already written is changed to [copy], step ST16 shows the case that the signature of the writer who writes data immediately after new data is written in the card is changed to [copy] and [copy] is determined. Similarly, steps ST7, ST9, ST11 and ST13 illustrate the case that the signature of the writer who writes data immediately after new data is written in the card is changed to [copy] and [copy] is determined. If a NO is output at step ST15, other processing that the aforementioned processings is carried out at step ST17, and then the processing proceeds to the end.

As described above, according to this embodiment, when the card data is turned over, printed out and recorded on the record medium or when the power source is turned OFF, the name of the writer who writes the card data is displayed so that the writer who describes the card data can be known immediately. Further, in the copied card data, the name of the writer who writes the card data is erased and changed into [copy]. Thus, it can be determined immediately whether the card data is the true card data or the copied card data.

Figure 3A:
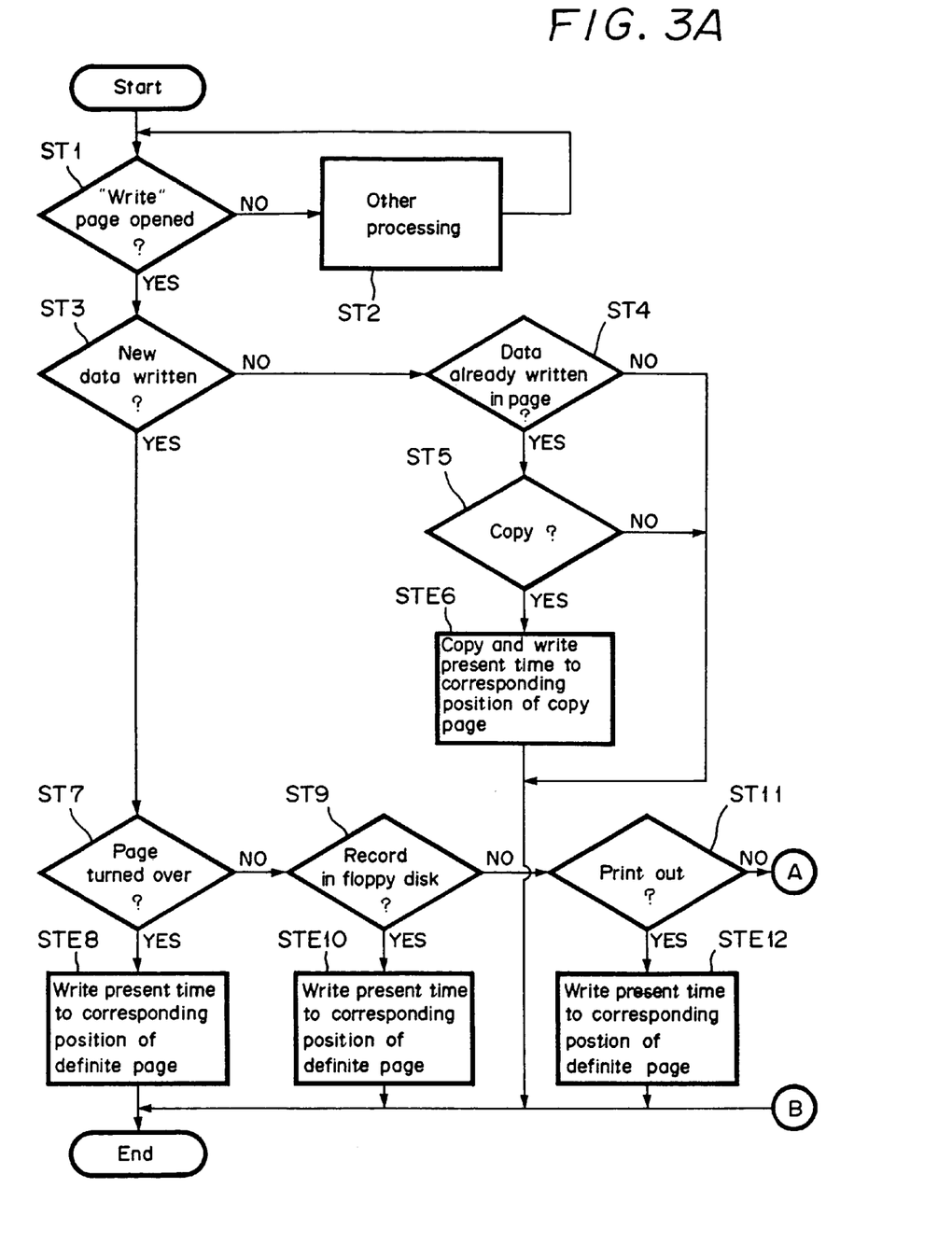
Figure 3B:
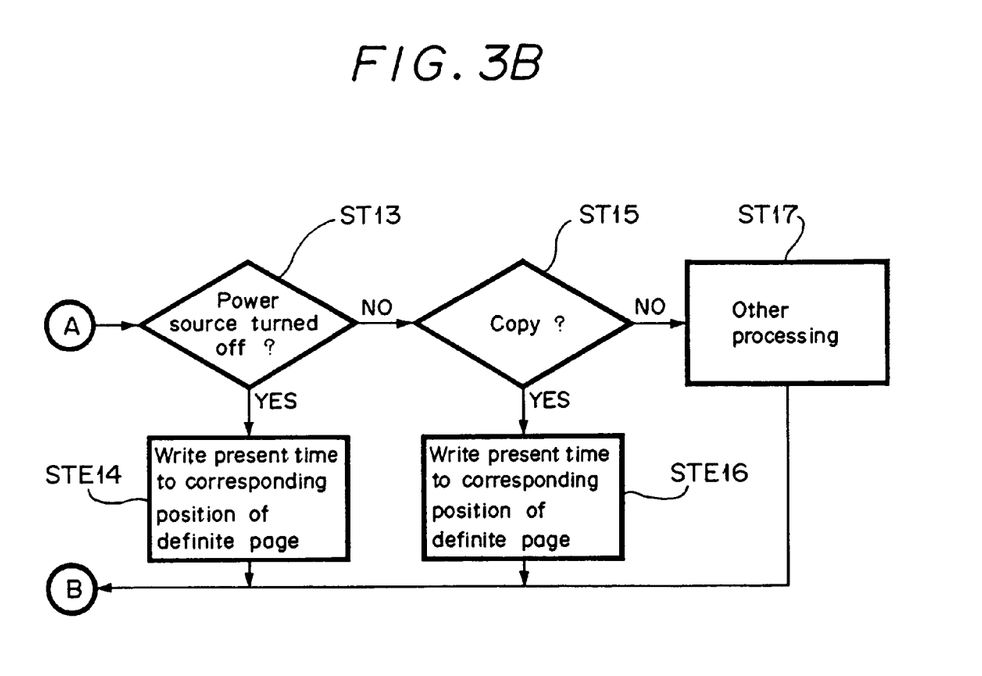

FIG. 3 (formed of FIGS. 3A and 3B drawn on two sheets of drawings so as to permit the use of a suitably large scale) is a flowchart to which references will be made in explaining an operation in which a time is recorded when data is recorded on a record medium such as a floppy disk or the like, when data is printed out, when the power switch is turned OFF and when data of the determined page is copied. In FIG. 3, like parts corresponding to those of FIG. 2 are marked with the same references and therefore need not be described in detail.

In FIG. 3, steps STE6, STE8, STE10, STE12, STE14 and STE16 correspond to steps ST6, ST8, ST10, ST12, ST14 and ST16 in FIG. 2. In steps STE8, STE10, STE12 and STE14, a value of present time from the timer 27 is written in the determined page at its. corresponding recording position. FIGS. 4C and 4D show card data in which a time 61 of the determined page is written. Further, in steps STE6 and STE16, the determined page is copied and a present time from the timer 27 is written in the copied page at its corresponding recording position. FIG. 4E shows the condition such that a current time 62 at which the determined page is copied is written in each card data.

According to the above-mentioned arrangement, even when the user receives card data (page data) by means of electronic mail, a FAX communication, IC card and so on and mixes the received card data with owner's card data, it is possible for the user to know clearly when and from whom the card data is sent, that is, those who sent the card data and the time at which data is transmitted.

While the copy of owner's signature and the writing of time are independently performed in the aforementioned embodiment, as shown in FIGS. 4C, 4D and 4E, the above operations may be performed at the same time. Further, it is needless to say that not only the time but also date may be registered.

Furthermore, the input of data is not limited to the pen 3 and data may be input to the apparatus by utilizing a keyboard and so on.

As set out above, according to the present invention, if any data is written in card data when the user opens the check page and the write page, the signature, sign, pen name or the like of the writer who writes the data is recorded and date and time when card data is determined are also recorded, thus making it possible for the user to know clearly the writer's name and time and date of the recording.

Further, according to the information processing apparatus of the present invention, it is possible for the user to know the time when card data is copied.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

I claim:

1. An information processing apparatus comprising:
    a display device configured to visually present information as an electro-optical image;
    an input device formed on the display device and configured to input information from an owner;
    a storage device configured to store owner information inputted from the input device by the owner and to store a plurality of documents inputted from the input device by the owner;
    a processor coupled to the display device, the input device and the storage device, and configured to execute the processes of:
    (1) displaying a first icon that can be used for opening a registration page;
    (3) displaying a second icon that can be used for opening an information page;
    (3) displaying the registration page on the display device as an electro-optical image, responsive to the first icon being selected using the input device;
    (4) inputting owner information written on the registration page by the owner using the input device;
    (5) storing the owner information inputted by the owner in the storage device;

(6) displaying the information page on the display device as an electro-optical image, responsive to the second icon being selected using the input device;

(7) inputting document information written on the information page by the owner using the input device;

(8) automatically adding the owner information at a predetermined position on the information page by duplicating the owner information stored in the storage device;

(9) storing the document written on the information page and the owner information added on the information page in the storage device; and (10) displaying the document with the owner information added automatically, when the document stored in the storage device is opened by the owner.

* * * * *